United States Patent [19]
Dubos et al.

[11] Patent Number: 4,741,519
[45] Date of Patent: May 3, 1988

[54] HYDRAULIC DAMPERS

[75] Inventors: Daniel Dubos, Asnieres; Jean-Luc Salaud, Conflans Ste Honorine, both of France

[73] Assignee: Hutchinson, France

[21] Appl. No.: 931,108

[22] Filed: Nov. 17, 1986

[30] Foreign Application Priority Data

Nov. 18, 1985 [FR] France ................. 85 16997

[51] Int. Cl.[4] ............................................. F16F 9/34
[52] U.S. Cl. ............................................. 267/140.1
[58] Field of Search ............... 248/562; 267/8 R, 136, 267/140.1

[56] References Cited

U.S. PATENT DOCUMENTS

| | | | |
|---|---|---|---|
| 3,947,007 | 3/1976 | Pelat | 267/140.1 |
| 4,159,091 | 6/1979 | Le Salver et al. | 267/140.1 X |
| 4,399,987 | 8/1983 | Cucelli et al. | 267/140.1 |
| 4,573,656 | 3/1986 | Yoshida et al. | 267/140.1 X |

Primary Examiner—Duane A. Reger
Attorney, Agent, or Firm—Larson and Taylor

[57] ABSTRACT

The invention relates to a damping and holding device having a rigid base (7), a rigid ring (9), a truncated cone shaped resilient wall (12) resisting axial compression and sealingly connecting the base to the ring, a flexible membrane (13) sealingly connected to the ring, a sealing dividing wall (14) connected to the ring between the truncated cone shaped wall and the membrane, a restricted passage (15) providing communication between the two sides of the dividing wall and a liquid mass (16) filling the case thus formed. The device further comprises a second truncated cone shaped resilient wall (17) resisting axial compression and oriented in a direction opposite that of the first one (12), the small bases of the two truncated cone shaped walls being juxtaposed axially and both secured to the base, and a rigid external framework (18) connecting the large base of the second rigid wall with the ring.

3 Claims, 1 Drawing Sheet

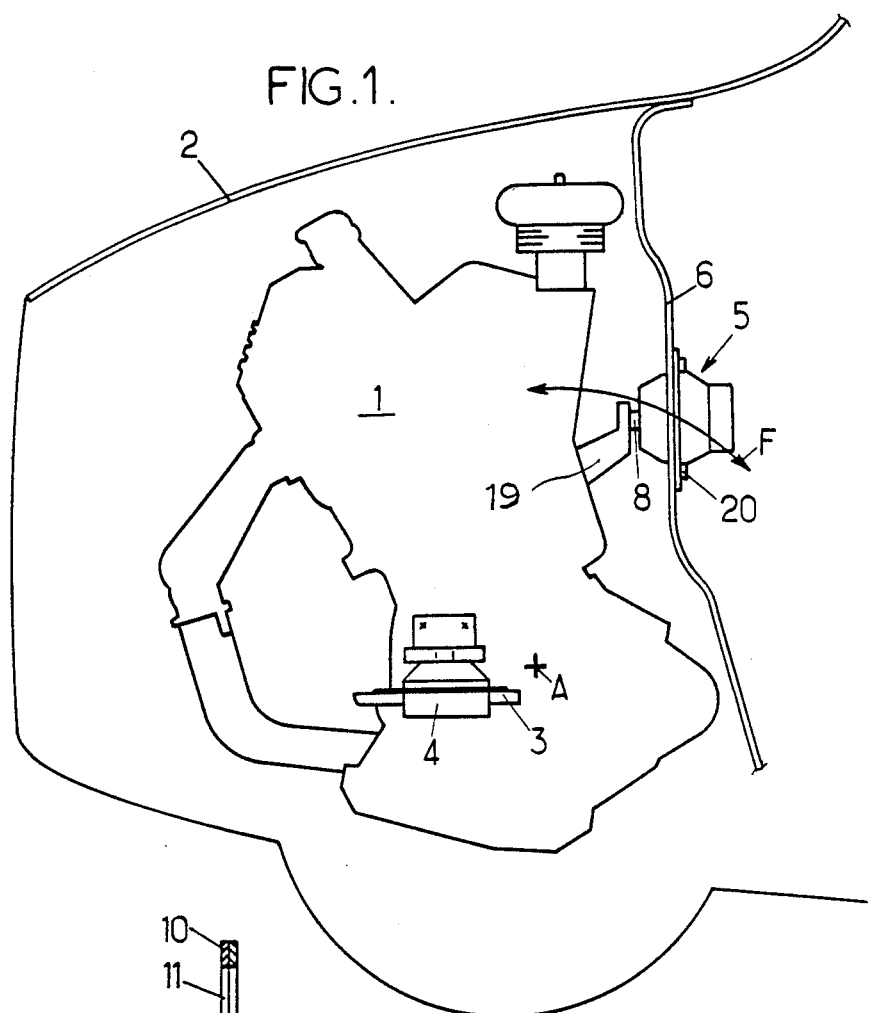
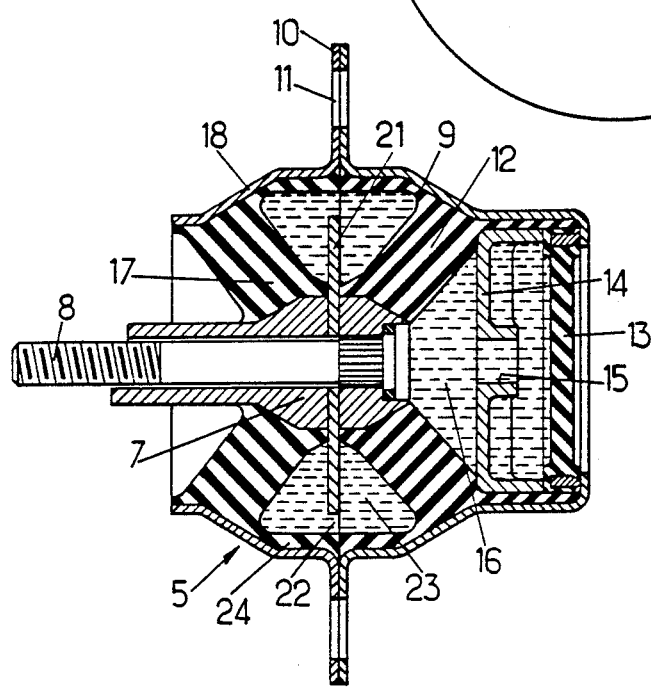

HYDRAULIC DAMPERS

The invention relates to devices intended to be inserted for support and damping purposes, between two rigid elements individually subjected to certain oscillations and/or vibrations, the damping causing a liquid to be driven through a restricted passage.

By way of non limitative example, such devices may be mounted between a vehicle chassis and the engine of this vehicle for damping not only the oscillations imposed on the chassis by the unevenness and gradient variations of the ground while the vehicle is travelling over this ground but also the vibrations due to the operation of the engine.

The invention relates more particularly, among the devices of the kind in question, to those which comprise a sealed case inserted between the two rigid elements, which case comprises a rigid base fixed to one of the two rigid elements, a rigid ring fixed to the other rigid element, a resilient wall of a substantially truncated cone shape resisting the axial compression and sealingly connecting the base to the ring and a flexible membrane sealingly connected to the ring, the inside of this case being divided, by a sealed dividing wall joined to the ring between the truncated cone shaped wall and the membrane, into two chambers, namely a work chamber on the truncated cone shaped wall side and a compensation chamber on the membrane side, these two chambers being permanently in communication with each other through the above restricted passage, which is formed between the two chambers and a liquid mass filling the two chambers as well as the restricted passage.

With such a support, the oscillations or vibrations created between the two rigid elements result in moving the two elements axially in turn together or away from each other and so in driving the liquid from one of the two chambers into the other through the restricted passage and conversely: the dimensions of this passage, and in particular its axial length and its cross-section, are determined as a function of the frequency of the phenomena to be damped or filtered so that these phenomena create in the mass of liquid flowing through said passage a resonance effect ensuring the desired damping or filtering.

In the known embodiments of such devices, these devices are inserted in the manner of supports, that is to say in a vertical direction or slightly slanting with respect to the vertical, between the two rigid elements so that the weight of the supported element is transmitted to the supporting element while axially compressing the truncated cone shaped wall.

The invention relates to the variants in which the devices of the kind in question are intended to work in a direction horizontal or slightly slanted with respect to the horizontal, and this indifferently in the two horizontal ways along said direction, the truncated cone shaped wall being subjected practically to no axial force for the average position of the device.

The device considered then no longer provides between the two rigid elements a support function properly speaking, but instead it provides a horizontal holding or maintenance function by constantly bringing the mobile held element back towards a mean rest position with respect to the fixed holding element.

A particularly advantageous application of such a holding device is that in which this device serves for damping the torque shocks generated in the engine of a vehicle by the sudden changes of operating conditions of this engine.

There follows a detailed description of a preferred embodiment of the present invention which is to be read together with the accompanying drawings which are not considered to limit the scope of the invention.

FIG. 1 is a schematic representation of the front of a vehicle equipped with a horizontal holding device in accordance with the present invention; and FIG. 2 is an axial sectional view through a holding device of the present invention.

Referring to FIG. 1, this figure shows the front of a vehicle equipped with a transverse engine 1.

This engine, protected by the hood 2, is mounted on chassis 3 by means of damping supports 4 which may be of the above described hydraulic type.

During accelerations of the engine, the torque exerted on its shaft, an axis A, is subjected to shocks, which are transmitted to the whole of this engine, and the same occurs, but in a reverse direction, for certain sudden decelerations.

The angular forces corresponding to these shocks have been shown by arrows F at the level of a complementary holding device 5 situated at the rear of the engine, above the axis A, and connecting this engine to a vertical portion of the dashboard 6 of the vehicle or the framework of this dashboard.

The direction of these arrows F is slightly slanted with respect to the horizontal and is here longitudinal with respect to the vehicle and the holding device 5 must firmly provide the engine-dashboard connection while damping the forces suddenly applied thereto in one direction or the other, as shown by the arrows F.

It is the horizontal holding devices of this kind which are the concern of the invention. The above defined supports are not satisfactory for use as such a device because their truncated cone shaped walls only work safely in the direction of axial compression thereof.

Now, although these walls are permanently compressed axially in the case of a vertical support, they would only be so in one of the two working directions in the case of horizontal holding, being on the contrary subjected to an axial tractive force in the opposite direction.

The purpose of the invention is especially to overcome this drawback by improving the operating safety of the damping devices considered.

For this purpose, the damping devices of the kind in question of the invention are essentially characterized in that they comprise, in addition to the above described elements, a second resilient wall of substantially truncated cone shape withstanding the axial compression and orientated in an opposite direction to the first one, the small bases of these two truncated cone shaped walls being juxtaposed axially and both firmly secured to the rigid base while the large base of the second rigid wall is itself firmly secured to the rigid ring by means of an external rigid framework.

In preferred embodiments, recourse is further had to one and/or the other of the following arrangements:

a transverse rigid plate secured to the base is inserted between the two small bases of the two truncated cone shaped walls has an outer cross section greater than the inner cross section of the axial end of the rigid framework, which is situated on the same side as the large base of the second truncated cone shaped wall;

in a device according to the preceding paragraph, the rigid framework is continuous and sealed and defines, with the outer faces of the two truncated cone shaped walls, an annular chamber filled with liquid, the plate defining with the framework portion which surrounds it a restricted passage for the flow of this liquid.

The invention comprises, apart from these main arrangements, certain other arrangements which are used preferably at the same time and which will be discussed more explicitly hereafter.

In a way known per se, the device considered, designated generally by the reference 5, includes:

a rigid central plug 7 integral with a stud bolt 8 for fixing, a rigid ring 9 extended outwardly by fixing lugs 10, themselves pierced with apertures 11, a resilient thick rubber wall 12 defined inwardly and outwardly by truncated cone shaped surfaces, which wall has its two ends bonded respectively to the plug 7 and to ring 9, a flexible membrane 13 whose periphery is sealingly connected to ring 9, a rigid dividing wall 14 perforated at its center at 15 and inserted axially between the thick wall 12 and the membrane 13, which dividing wall has its periphery sealingly connected to ring 9, and a liquid mass 16 filling the inner volume of the sealed case thus formed, including the passage 15.

This device further comprises here:

a second thick resilient wall 17 made from rubber oriented in the opposite direction to the first wall 12, the small base of this second wall 17 being juxtaposed axially with the small base of said wall 12 and being bonded like the latter to the central plug 7, which is extended axially accordingly; and a rigid external framework 18 which connects the large base of the second thick wall 17 to the ring 9.

For the above mentioned application to the upper rear longitudinal support of a transverse engine 1, shown schematically in FIG. 1, the stud bolt 8 is fixed to a bracket 19 integral with engine 1 and the two lugs 10 are fixed by nut-bolt systems 20 or the like passing through the apertures 11 to a vertical portion of the dashboard 6, which portion itself has the device concerned mounted therethrough.

Thus, for the neutral or rest state of this device, neither of the two truncated cone shaped walls 12 and 17 is subjected resiliently to an axial compression force or to an axial tractive force.

From this rest state, any angular force exerted rearwardly on the top part of the engine 1 (towards the right in the Figures) results in an operation of the holding device similar to those of known supports, such operation causing axial compression of the first truncated cone shaped wall 12.

The second truncated cone shaped wall 17 is then subjected axially to a tractive force, but with a very limited amplitude which corresponds exactly to the amplitude of the axial deformation under compression of the first wall.

Conversely, an angular force directed in the direction opposite the preceding one, that is to say towards the left in the Figures, results in an axial compression of the second wall 17 and in an axial tractive force of limited amplitude applied to the first wall 12.

Thus, in all cases, the essential part of the resilient deformation effect is absorbed by one of the two truncated cone shaped walls working under compression and the very existence of this wall limits the tractive force applied to the other wall to a reasonable value.

To further increase the safety of the device, a rigid transverse plate 21 integral with plug 7 is advantageously provided between the two truncated cone shaped walls, this plate being too large to be able to pass through the opening in the framework 18 situated on the same side as the large base of the second wall 17.

Thus, even though the two truncated cone shaped walls are destroyed, the engine 1 remains engaged with the dashboard 6 by plate 21 coming into abutment against the internal face of the transverse opening in framework 18.

In each case, the oscillations and/or vibrations are damped in the usual way by choking liquid 16 in passage 15.

At least one complementary damping adjusted to a frequency other than that taken into account by passage 15 may be advantageously provided, for example by forming in a way known per se a portion of the inner face which defines the sealed case filled with liquid 16 by means of a dividing wall which is deformable or movable with a limited range of movement.

According to another improvement, the annular chamber defined by the external faces of the two truncated cone shaped walls 12 and 17 and by the inner face of the framework 18—ring 9 assembly is provided sealed, inside this chamber an annular space 22 is formed of predetermined radial width between the periphery of plate 21 and the wall portion which surrounds it and said chamber is filled with a damping liquid 23.

Choking of this liquid 23 in passage 22 during deformation of the device may be used for damping one of the oscillating or vibrating phenomena likely to appear and which would not be otherwise damped.

In this latter construction, the framework 18 and ring 9 are both in the form of annular shells both comprising a radial collar extended outwardly by the perforated fixing lugs 10.

These two shells are assembled together sealingly by welding these collars one on the other.

The inner face of said shells is advantageously lined with a protective rubber lining 24 integrally molded with the corresponding walls 12 and 17.

Following which, whatever the embodiment adopted, a horizontal holding damping device is finally obtained whose construction, operation and advantages follow sufficiently from the foregoing.

As is evident, the invention is not limited to the embodiments and modes of application which have been described above.

It extends, on the contrary, to all the variants which may be envisaged and, in particular:

to those where the annular walls of a truncated cone shape resisting axial compression are defined inwardly and/or outwardly by faces having a form other than the form of a truncated cone, i.e. of revolution with an axial half section in the form of an oblique straight line segment, said form being still for example of revolution and widening out, but with an axial half section in the form of a C or an S, or else annular and opening out, but not of revolution, to those where the restricted passage which causes the two faces of the rigid wall 14 to communicate with each other, instead of being formed by a hole 15 in the center of this dividing wall, is formed in a way known per se by a channel in the form of an arc of a circle extending about said wall.

and to those where a portion of the working chamber is defined in a way known per se, by a movable or deformable dividing wall capable of moving or being deformed perpendicularly to itself, with an amplitude limited to a low value, particularly of the order of 0.5 mm, so as to filter certain vibrations of small amplitude and relatively high frequency.

We claim:

1. Device intended to be inserted for the purposes of holding and damping between two rigid elements, including a sealed case inserted between the two rigid elements, which case includes a rigid base (7) able to be fixed to one of the two rigid elements, a rigid ring (9) able to be fixed to the other rigid element, a resilient wall (12) of a substantially truncated cone shape resisting axial compression and sealingly connecting the base to the ring, and a flexible membrane (13) sealingly connected to the ring, the inside of this case being divided, by a sealed dividing wall (14) connected to the ring between the truncated cone shaped wall and the membrane, into two chambers permanently communicating with each other through a restricted passage (15), and a liquid mass (16) filling the two chambers as well as the restricted passage, characterized in that it further includes a second resilient wall (17) of a substantially truncated cone shape resisting axial compression and oriented in a direction opposite that of the first one (12), the small bases of these two truncated cone shaped walls being juxtaposed axially and both secured to the rigid base (7), and a rigid external framework (18) connecting the large base of the second resilient wall to the rigid ring (9).

2. Device according to claim 1, characterized in that a transverse rigid plate (21) integral with the base (7) is inserted between the two small bases of the two truncated cone shaped walls (12, 17) and has an external cross section larger than the internal cross section of the axial end, of the rigid framework (18), which is situated on the same side as the large base of the second truncated cone shaped wall (17).

3. Device according to claim 2 characterized in that the rigid framework (18) is continuous and sealed and defines with the outer faces of the two truncated cone shaped walls (12, 17) an annular chamber filled with liquid (23), the plate (21) defining with the framework portion which surrounds it a restricted passage (22) for the flow of this liquid.

* * * * *